(12) United States Patent
Schlichter et al.

(10) Patent No.: US 10,561,966 B2
(45) Date of Patent: Feb. 18, 2020

(54) DEVICE FOR TREATING FLUID MIXTURES

(71) Applicant: HYDAC PROCESS TECHNOLOGY GMBH, Neunkirchen (DE)

(72) Inventors: Bernard Schlichter, Saarbruecken (DE); Stefan Schlachter, Contwig (DE); Sergej Zeller, Katzweiler (DE); Michael Welker, Eppelborn (DE)

(73) Assignee: HYDAC PROCESS TECHNOLOGY GMBH, Neunkirchen (DE)

( * ) Notice: Subject to any disclaimer, the term of this patent is extended or adjusted under 35 U.S.C. 154(b) by 300 days.

(21) Appl. No.: 15/501,232

(22) PCT Filed: Jul. 18, 2015

(86) PCT No.: PCT/EP2015/001485
§ 371 (c)(1),
(2) Date: Feb. 2, 2017

(87) PCT Pub. No.: WO2016/023610
PCT Pub. Date: Feb. 18, 2016

(65) Prior Publication Data
US 2017/0225101 A1    Aug. 10, 2017

(30) Foreign Application Priority Data

Aug. 13, 2014  (DE) .................. 10 2014 012 094

(51) Int. Cl.
*B01D 19/00*  (2006.01)
*B01D 46/00*  (2006.01)
*B01D 45/12*  (2006.01)

(52) U.S. Cl.
CPC ......... *B01D 19/0052* (2013.01); *B01D 45/12* (2013.01); *B01D 46/0023* (2013.01); *B01D 46/0031* (2013.01); *B01D 2267/40* (2013.01)

(58) Field of Classification Search
CPC  B01D 19/0052; B01D 2267/40; B01D 45/12; B01D 46/0023; B01D 46/0031
See application file for complete search history.

(56) References Cited

U.S. PATENT DOCUMENTS 5,749,945 A      5/1998  Beck
2001/0005986 A1*  7/2001  Matsubara ............ B01D 45/12
                                                      55/459.1

(Continued)

FOREIGN PATENT DOCUMENTS

DE    10 2005 062 245    6/2007
EP         1 844 840    10/2007

(Continued)

OTHER PUBLICATIONS

International Search Report (ISR) dated Oct. 19, 2015 in International (PCT) Application No. PCT/EP2015/001485.

*Primary Examiner* — Cabrena Holecek
(74) *Attorney, Agent, or Firm* — Wenderoth, Lind & Ponack, L.L.P.

(57) ABSTRACT

A device for treating fluid mixtures, which contain gases, such as hydrogen (H2), air, nitrogen (N2), or natural gases, and liquids, such as ionic liquids, hydraulic fluid, or process liquids, has a first separation stage (29) for separating the fluid mixture into a liquid fraction and a gas fraction contaminated with a remaining liquid fraction. From the gas fraction, the remaining liquid fraction is removed in at least one further separation stage (67).

12 Claims, 4 Drawing Sheets

(56) References Cited

U.S. PATENT DOCUMENTS

| | | |
|---|---|---|
| 2008/0250772 A1 | 10/2008 | Becker et al. |
| 2009/0223186 A1* | 9/2009 | Herges .................. B01D 45/12 55/317 |
| 2011/0056379 A1 | 3/2011 | Lucas |
| 2013/0025461 A1 | 1/2013 | Gouy et al. |
| 2014/0033922 A1 | 2/2014 | Peck et al. |

FOREIGN PATENT DOCUMENTS

| | | |
|---|---|---|
| WO | 2010/145731 | 12/2010 |
| WO | 2014/022385 | 2/2014 |

\* cited by examiner

DEVICE FOR TREATING FLUID MIXTURES

FIELD OF THE INVENTION

The invention relates to a device for treating fluid mixtures that contain gases, such as in particular hydrogen ($H_2$), air, nitrogen ($N_2$), or natural gases, and liquids, such as in particular ionic liquids, hydraulic fluid, or process liquids.

The invention specifically relates to the treatment of a fluid mixture under high pressure that contains gas such as hydrogen and small fractions of liquids such as ionic liquids.

BACKGROUND OF THE INVENTION

What is meant exactly by ionic liquids is illustrated in, for example, the scientific paper entitled *Ionische Flüssigkeiten: Einzigartige Materialien mit vielfaltigen Möglichkeiten* [Ionic Liquids: Unique Materials with Diverse Possibilities], published on 15 Jul. 2014 and accessible online at "CHE Manager-online.com."

Hydrogen under high pressure of about 700 bar to 1000 bar is now available at fueling stations for hydrogen-powered vehicles. So-called "ionic compressors" as disclosed in, for example, the online publication entitled *Ionenverdichtertechnologie, Wie funktioniert ein lonenverdichter?* [Ionic Compression Technology, How does an ionic compressor work?] of the company "Flowserve", published on 15 Jul. 2014 (FCS-Prasentation 170909 deutsch-DBI) and accessible at www.dbi-gti.de, are advantageously used for compression. An ionic compressor is similar to a piston compressor, but employs an ionic liquid column instead of a piston. Compared to a displacing piston, the liquid acting as a displacing element has the advantage of being better able to remove the resulting heat. A certain fraction of this heat is conveyed from the compressor along with the compressed gas. The ionic liquids are customarily organic salts that are liquid at temperatures below 100° C., without the salt being dissolved in a solvent such as water.

At the high pressure level during the operation of ionic compressors, there is an input of liquid fractions into the gas. This input is also known as carryover in technical jargon and makes it necessary to treat the fluid mixture.

SUMMARY OF THE INVENTION

In light of these problems, the object of the invention is to provide device that enables a reliable separation of the mixture components.

According to the invention, this object is basically achieved with a device having at least a first separation stage for separating the fluid mixture into a liquid fraction and a gas fraction, which gas fraction is contaminated with a remaining liquid fraction. From that gas fraction, this remaining liquid fraction is removed in at least one additional separation stage. Due to the fact that the separation process inventively takes place in several stages, after carrying out a first separation process, it is possible to carry out a fine separation in a second separation stage such that a relevant liquid fraction (such as ionic liquid) is available again in the purity required for use and such that the gas fraction obtained is kept free of this liquid.

In a particularly advantageous manner, a centrifugal separator is provided as a first separation stage, in which the liquid that is relatively denser than the gas moves to the wall of the cyclone housing under the centrifugal effect of the swirl flow generated. From the wall the liquid drains out. Because the centrifugal forces effecting the separation process are generated by the speed of the fluid mixture flowing into the cyclone housing and flowing through the device, the device according to the invention can also be operated in an energy efficient manner.

For an efficient fine separation of remaining liquid fractions, advantageously a coalescing filter is provided as a second separation stage. This second separation stage can follow the first separation stage directly, or preferably indirectly via interposition of a third separation stage.

In particularly advantageous exemplary embodiments of the invention, all separation stages are arranged in a common housing. The housing has an inlet for the fluid mixture, an outlet for the gas fraction separated from the liquid, and at least one emptying outlet for removing the separated liquid. The entire device then forms a compact structure that functions without external plumbing, which is particularly advantageous at the potentially very high pressure level.

The housing can have a cavity extending along a vertical axis, in which cavity the centrifugal separator is arranged between the overlying coalescing filter and the underlying collection space for receiving separated liquid. In this arrangement, liquid can drain directly from the centrifugal separator into the collection space.

Advantageously, on the lower end of the centrifugal separator bordering the collection space, the interior wall of the cyclone cylinder of the centrifugal separator delimits a ring opening between a pipe section concentric to the axis. The ring opening forms a connection between the area of the cyclone cylinder distal to the axis and the collection space. Droplets deposited on the interior wall of the cyclone housing can then drain continuously into the collection space.

The pipe section delimiting the ring opening can be part of a connection between the area of the cyclone cylinder proximal to the axis and the upper area of the collection space such that the gas located in the area of the cyclone housing proximal to the axis, as the less dense mixture component, directly enters the upper area of the collection space In the standard manner for such filters, the coalescing filter can have a filter material surrounding an interior filter cavity. A connection channel is provided between the upper area of the collection space, which communicates with the area of the cyclone cylinder proximal to the axis via the pipe section, and the filter cavity of the coalescing filter. The gas exiting the cyclone separator via the pipe section and containing a reduced liquid fraction then reaches the second separation stage carrying out the fine separation.

In particularly advantageous exemplary embodiments, the coalescing filter has a coaxial interior pipe, which opens, at its upper end, into the space of the housing bordering the outer side of the filter casing and leads, at its lower end, to the housing outlet for the gas fraction. In a particularly advantageous manner, the gas is then removed from the filter chamber containing the coalescing filter via an axial interior pipe, rather than by the space surrounding the filter casing, such that optimum flow conditions prevail in the filter chamber and there is thus no danger of carrying along coalesced liquid, which is deposited on the outside of the filter casing. According to another advantage of this particular construction of the coalescing filter with an interior pipe, disassembly during the changing of the filter material is simplified. After the housing is taken off, the filter material together with the interior pipe can then be removed from the device as an assembly unit and replaced with a new assembly unit. The housing outlet to the gas fraction and a connection channel to the filter chamber can then be arranged in the part of the device that is not taken off with the housing.

For a particularly effective fine separation, in a particularly advantageous manner a demister can be used as a third separation stage between the upper end of the collection space and the connection channel that leads to the interior filter cavity of the coalescing filter. This third separation stage is then provided between the first separation stage and the second separation stage.

Between the floor area of the collection space and an emptying outlet, provision can be made of a particle filter for carrying out a maintenance filtration of the ionic fluid during the emptying of the collection space. The collection space can be designed for storing a liquid volume. A fill level monitoring system can be provided in the collection space in order to carry out emptying processes according to a fill level.

The device according to the invention enables a particularly efficient fluid separation for a very compact configuration of the housing and for a minimum of necessary plumbing. A pressure-stable construction can be provided in stainless steel element technology.

Other objects, advantages and salient features of the present invention will become apparent from the following detailed description, which, taken in conjunction with the drawings, discloses a preferred embodiment of the present invention.

BRIEF DESCRIPTION OF THE DRAWINGS

Referring to the drawings that form a part of this disclosure.

DETAILED DESCRIPTION OF THE INVENTION

Figure 1:
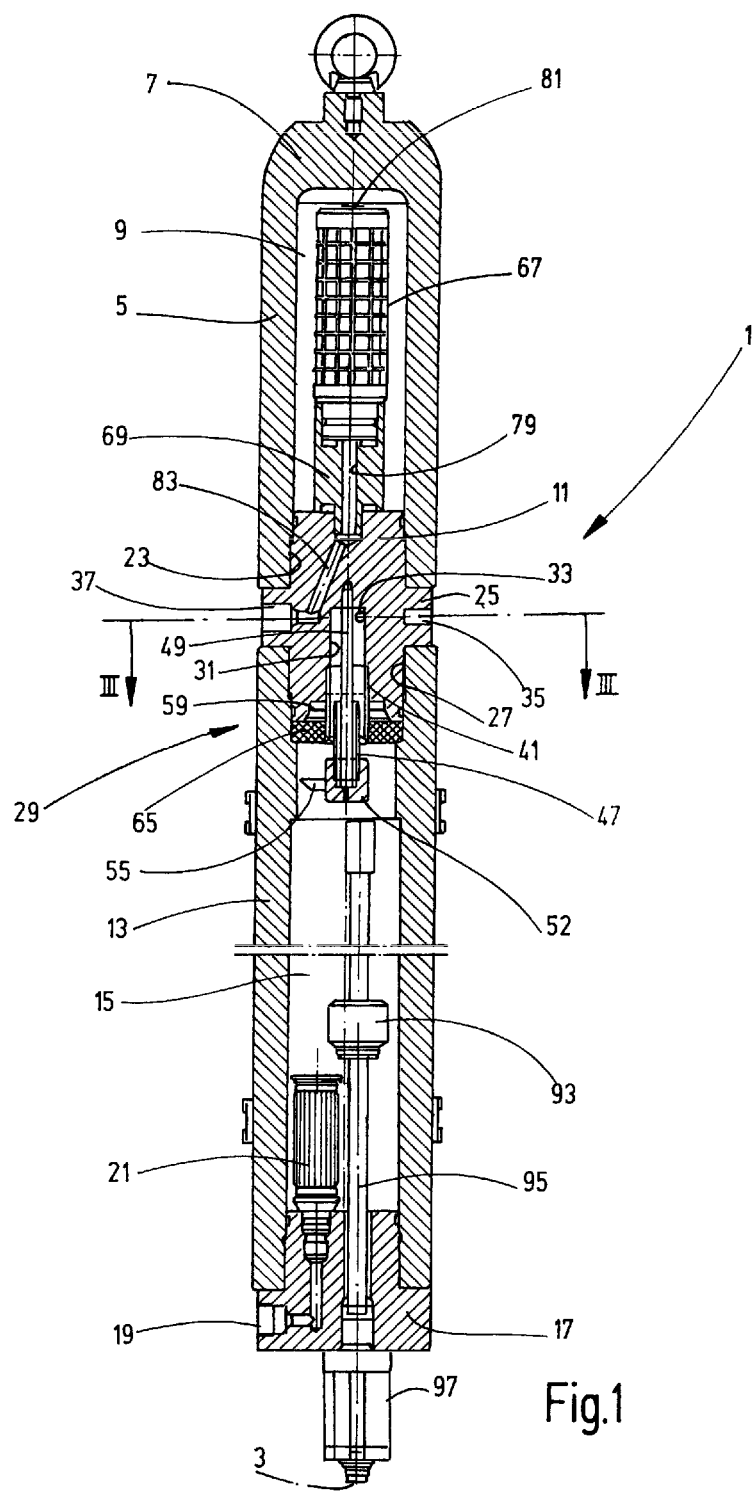
FIG. 1 is a side view in section in shortened form of a device according to an exemplary embodiment of the invention.
Figure 3:
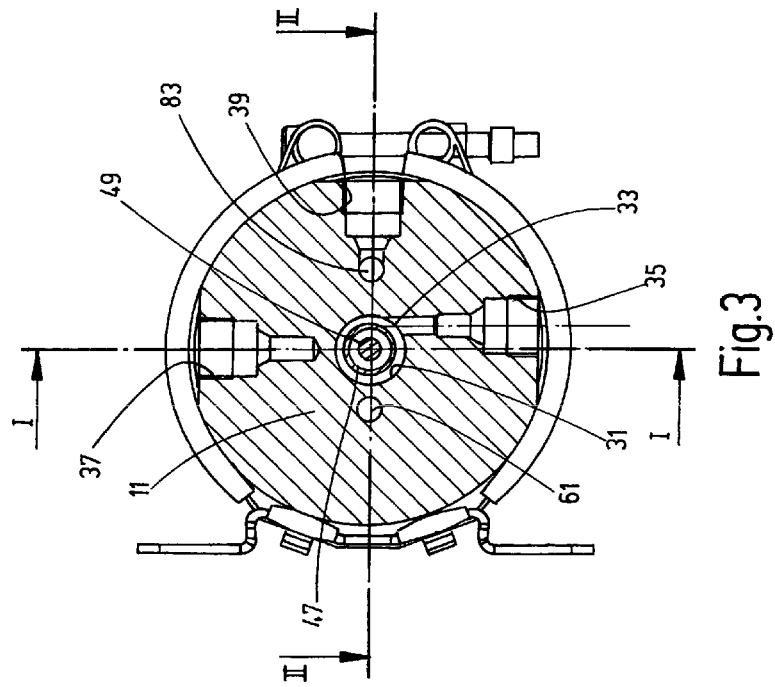
FIG. 3 is a top plan view in section take along line III-III of FIG. 1.

With reference to the drawings, the invention is explained with the example of a device that is provided for separating liquid fractions from a fluid stream of a fluid mixture under a pressure of 700 bar to 1000 bar. The fluid mixture predominantly has hydrogen gas with fractions of an ionic liquid. Any solid particles that may be present in the fluid mixture can also be separated from the gas by the device. The device shown can obviously be used for treating other media mixtures that contain, in a gas, liquid fractions that need to be separated and possibly solid particles that need to be separated.

The illustrated exemplary embodiment of the device has a longitudinally extended housing 1, which as a whole possesses the shape of a circular hollow cylinder. The axis 3 of housing 1 extends vertically in the installed position of the device. The housing 1 has an upper housing part 5 that delimits a coalescing filter chamber 9 with its rounded end piece 7. The lower open end of the upper housing part 5 is screwed tightly to an intermediate part 11, which forms the transition to a lower housing part 13. Lower housing part 13 prolongs the circular cylindrical outer contour of the upper housing part 5 and delimits an interior collection space 15 that is closed on its lower end by a tightly screwed-in floor part 17. Located in the floor part 17 is an emptying outlet 19 with an upstream particle filter 21, via which the liquid located in the collection space 15 can be drained from the floor area of the collection space 15.

Figure 2:
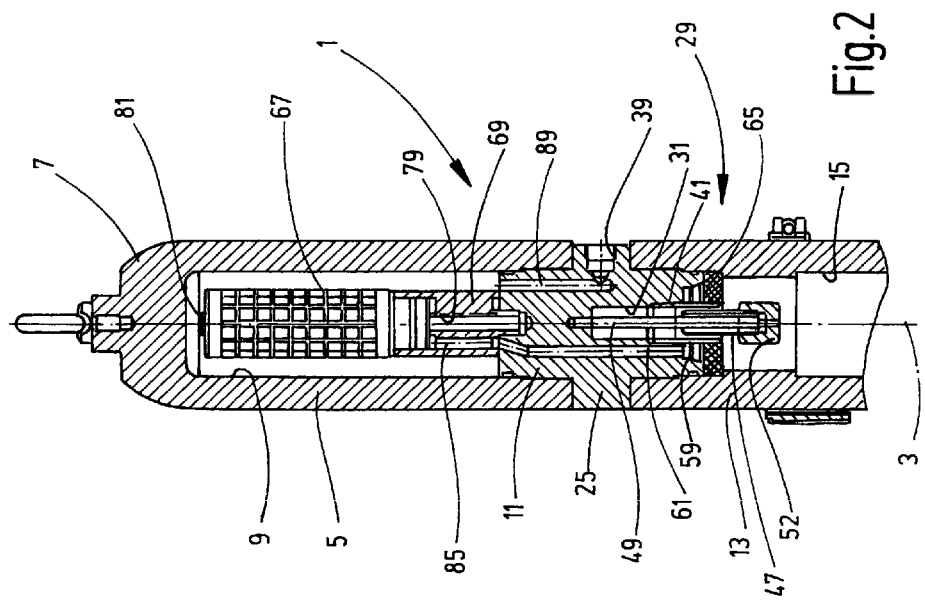
FIG. 2 is a partial side view in section that only shows the area of a centrifugal separator and of an overlying coalescing filter of the device of FIG. 1, wherein the cutting plane is rotated 90° with respect to FIG. 1.

The intermediate part 11 has the form of a rotation body that forms, subsequently to its being screwed by its threaded section 23 to the upper housing part 5, a radially projecting flange 25 to which in turn a lower threaded section 27 connects. The tight screw connection to the lower housing part 13 is formed with lower thread section 27. On the upper side and on the lower side, the flange 25 then forms the respective contact surfaces for the end edge of the upper housing part 5 and for the end edge of the lower housing part 13, respectively. The centrifugal separator 29 (FIGS. 2 and 4) that forms the first separation stage with the circular cylindrical cyclone housing 31 concentric to the axis 3 is located in the intermediate part 11. An inflow opening 33 opens at the upper end of the cyclone housing 31. Via this opening 33, the fluid mixture can flow tangentially from a fluid inlet 35 formed in the flange 25 into the cyclone housing 31 such that a swirl flow or a cyclone is formed in the cyclone housing 31, in the manner typical of cyclone separators 29. In addition, an outlet 37 for draining off the gas fraction separated from the fluid mixture, a liquid outlet 39 arranged offset by 90° in relation to the inlet 35 and the outlet 37 (see FIGS. 2 and 5), and channels forming fluid connections are located in the intermediate part 11.

Figure 4:
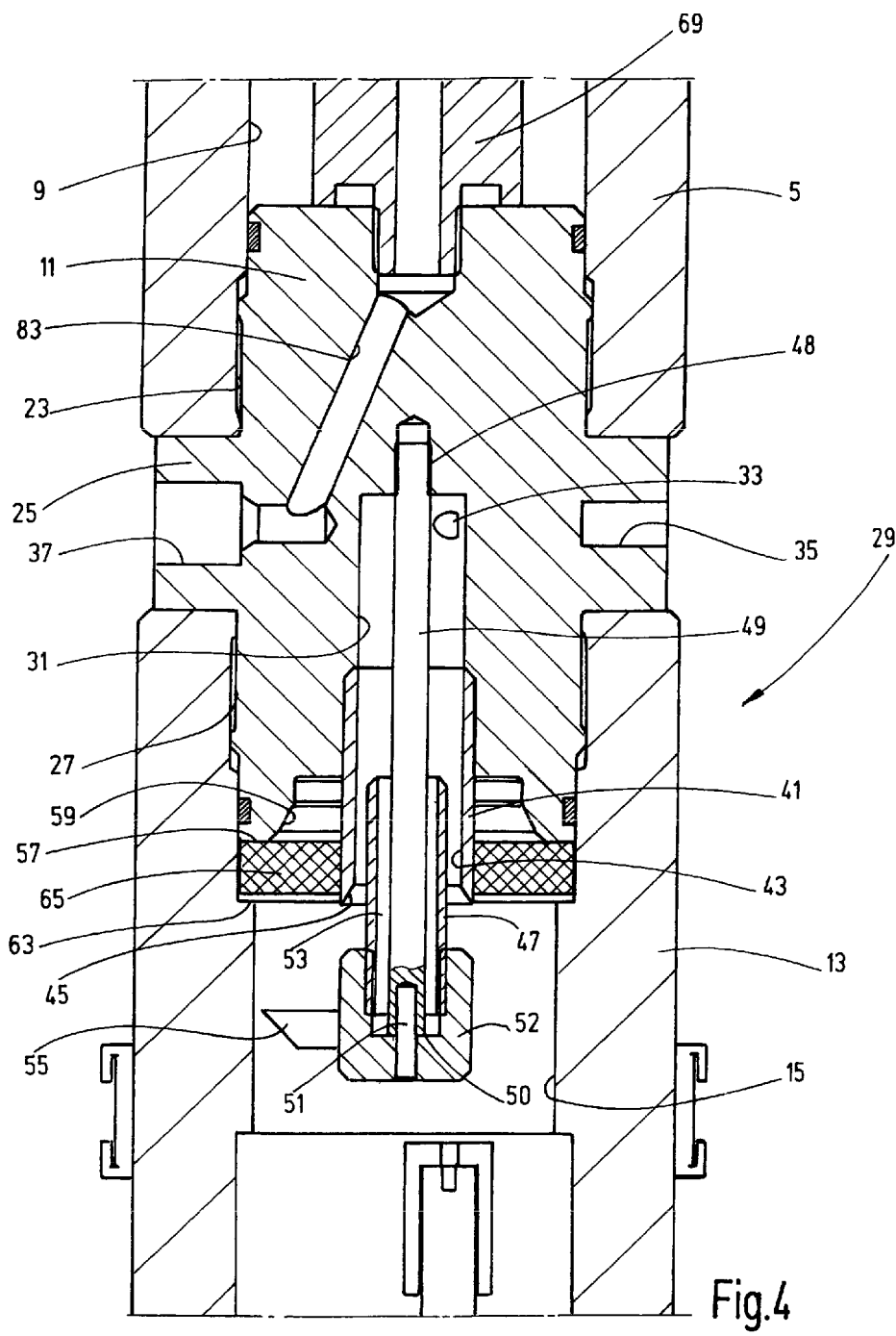
FIG. 4 is an enlarged, partial side view in section of the length section containing the centrifugal separator, with the same section plane as in FIG. 1.

As is most clearly discernible in FIG. 4, a sleeve 41, which is inserted into the intermediate part 11 and which extends axially beyond the lower end of the intermediate part 11 in the direction of the collection space 15, forms the end section of the interior wall 43 of the cyclone housing 31. On the lower end of the sleeve 41, the interior wall 43 delimits a ring opening 45 between a pipe section 47, which extends concentrically to the axis 3 into the sleeve 41 and out into the collection space 15 via the lower end at sleeve 41. In this arrangement, the ring opening 45 forms the connection between the lower area of the cyclone housing 31 distal to the axis and the collection space 15. In other words, ring open 45 is the outlet opening via which droplets that have been deposited, as the more dense mixture component of the fluid mixture, on the interior wall 43 under the effect of centrifugal force, can exit.

A carrier rod 49 anchored at the upper end of the cyclone housing 31, specifically in the intermediate part 11 near 48, extends coaxially through the cyclone housing 31 and out of it via the lower end of the pipe section 47. By pin 51 seated in the lower end 50 of the carrier rod 49, a cover part 52 is mounted on the carrier rod 49. The lower end of the pipe section 47 is in turn screwed into cover part 52 such that the carrier rod 49 forms the carrier element for the pipe section 47. Pipe section 47 surrounds the carrier rod 49 at a distance. The interior space 53 of the pipe section 47 then forms a connection between the area of the cyclone housing 31 proximal to the axis and a gas outlet nozzle 55, which opens inside the cover part 52 into the interior space 53 of the pipe section 47. The gas fraction located in the area of the cyclone housing 31 proximal to the axis then exits via the outlet nozzle 55 into the upper area of the collection space 15.

A funnel-shaped recess 59 is located in the end surface of the intermediate part 11 facing the collection space 15, within the end edge 57 thereof. Starting from this recess 54, a connection channel 61 extends to the upper end surface of the intermediate part 11, as can be best discerned in FIG. 5. A demister 65, which surrounds the end of the sleeve 41 projecting from the recess 59, is arranged in a manner known per se between the end edge 57 and a ledge 63 on the interior wall of the lower housing part 13. The gas fraction exiting the pipe nozzle 55 and other gas fractions that are at least partially impregnated with liquid and that surround the pipe section 47, on the outer circumference thereof, therefore pass through the demister 65 prior to entering the recess 59, before the respective gas fraction further freed of liquid flows in upward movement along the flow path through the connection channel 61 to the upper side of the intermediate part 11.

Figure 5:
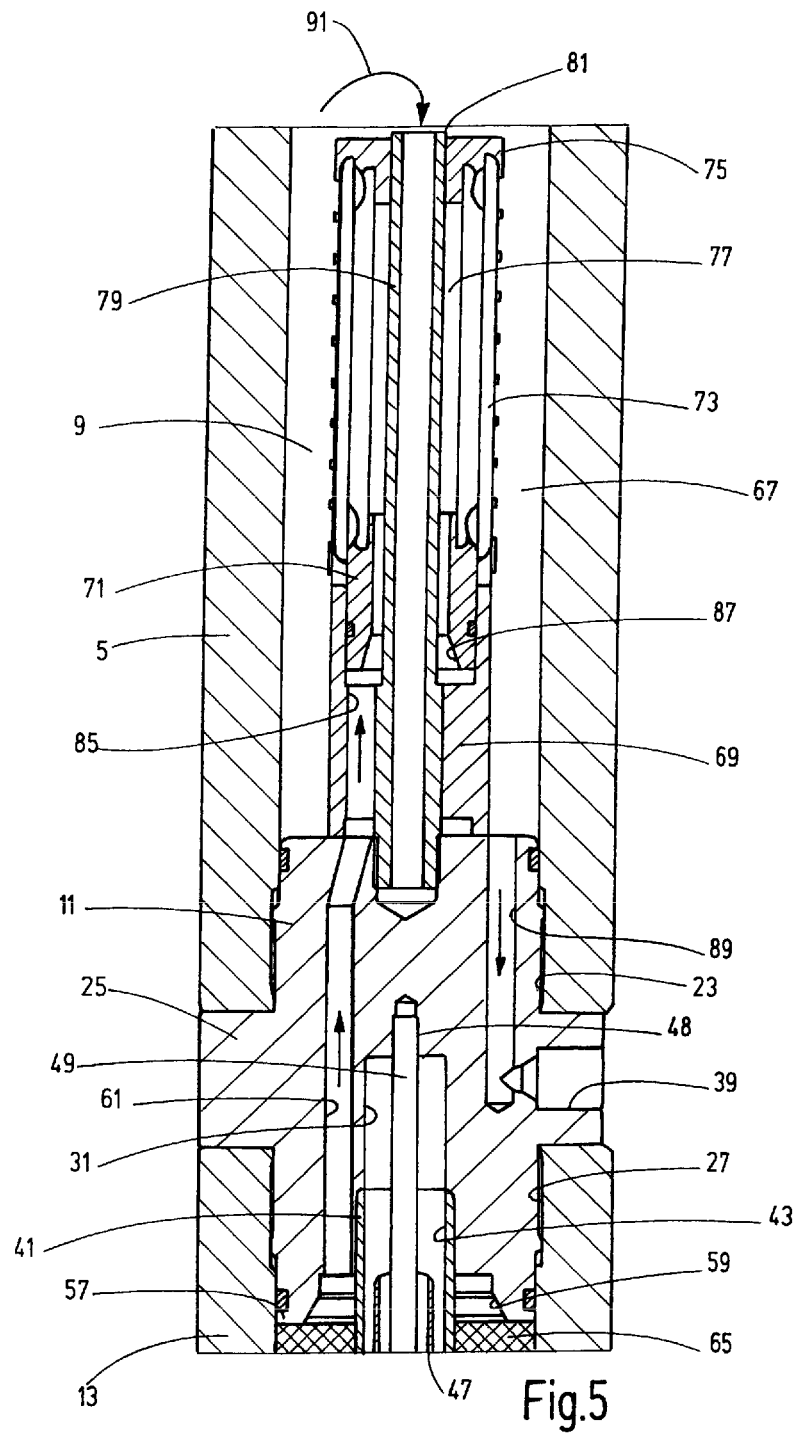
FIG. 5 is an enlarged, partial side view in section of the length area of the centrifugal separator and of the coalescing filter, with the same section plane as in FIG. 2.

The coalescing filter 67, forming the second separation stage, is arranged on the upper side of the intermediate part 11, forming the lower end of the coalescing filter chamber 9 (FIG. 5). This filter 67 has a foot part 69 that connects to the upper side of the intermediate part 11 and that forms a seat for a lower end part 71, from which the filter material 73 extends to the upper end part 75 of the coalescing filter 67. Within the filter cavity 77 surrounded by the filter material 63, an interior pipe 79 extends coaxially through the entire coalescing filter 67. The interior pipe 79 is open at its upper end 81, passing through the end part 75, and is then in fluid communication with the space of the filter chamber 9. The other, lower end of the interior pipe 79, which lower end extends into the intermediate part 11, is connected to the outlet 37 for the gas fraction via an oblique channel 83, as FIGS. 1 and 4 show.

As indicated with flow arrows in FIG. 5, the gas exiting from the pipe nozzle 55 in the upper area of the collection space 15, which after having passed through the centrifugal separator 29 has only a reduced liquid fraction, passes through the demister 65 and, via the connection channel 61, an adjoining passage 85 in the foot part 69 and also an opening 87 in the lower end part 71 of the coalescing filter 67, reaches the interior filter cavity 77 thereof. In filter cavity 47, the gas flows from inside to outside through the filter material 73 of coalescing filter 67, which forms the second separation stage. In this process, remaining liquid fractions are deposited on the outside of the filter material 73, from where they migrate downward within the filter chamber 9 and, from the floor of the filter chamber 9, reach the liquid outlet 39 via a vertical channel 89.

The gas, which reaches the surrounding filter chamber 9 from the interior filter cavity 77 after having flowed through the filter material 73, is free of liquid fractions after having passed through the cyclone separator 29, after having passed through the demister 65, and after having passed through the coalescing filter 67. Owing to the fact that they are denser than hydrogen, liquids as well as solid particles can be separated from the hydrogen by the cyclone separator 29. The demister 65 interposed in the separation process enables droplets larger than 5 μm to be separated from the gas flow of the fluid mixture so that the downstream coalescing filter 67 is used exclusively for treating the finest droplets smaller than 5 μm. The demister 65 is therefore disposed upstream of the coalescing filter 67 as a third separation stage for a particularly effective fine separation. From the filter chamber 9 and as indicated by the curved arrow 91 in FIG. 5, the gas enters the interior pipe 79 via the upper end 81 and from there it reaches the outlet 37 of the gas side via the oblique channel 83. With the routing of the flow via the axial interior pipe 79, the hazard of liquid droplets (which are located on the outside of the filter material 73 in the filter chamber 9) being entrained to the gas outlet 37 is then avoided.

In the illustrated exemplary embodiment, the collection space 15 for receiving a supply of separated liquid that drained into the collection space via the ring opening 45 of the cyclone housing 31, is configured such that a volume of 5 liters, for example, can be received in the collection space 15 within the lower housing part 13. As shown in FIG. 1, provision can be made of a control mechanism in the form of a fill level indicator for controlling emptying processes taking place via the outlet 19. In this example, provision to this effect is made of a floating body 93, which is guided on a guide 95 that forms the measuring section for a position sensor system 97. This indicator can be a non-contact sensor mechanism, for example a magnetostrictive process in which a waveguide is tensioned within the guide 95.

In summary, it can be concluded that the concrete exemplary embodiment of the device according to the invention is used to treat a gas flow, for example hydrogen under high pressure that is only slightly contaminated with liquids, for example ionic fluids on an order of up to 5% maximum.

For the separation to this effect, the device solution according to the invention employs three different separator stages that are used for separating out contaminants in both liquid and particulate form. In the sequence of the treatment process, these would be:
1. Centrifugal separator, which enables a separation of higher density particles and liquids,
2. Demister, which enables a separation of larger droplets, specifically larger than 5 μm, and accordingly prevents liquid from penetrating the coalescing filter element, and
3. Coalescing filter element, which is used for separating the finest aerosols, preferably with a droplet size less than 5 μm.

In addition to minimizing liquid carry-over, the removal of the filtered gas from the collection space 9 through the coaxially arranged drainage line 79 offers a further advantage for the device that the pressure vessel or rather the filter housing of the coalescing filter can be configured as two parts (components 5 and 11). All supply and drainage lines can be housed in a fixed part 11 of the device. Because it is not necessary to disconnect any lines and the housing head permits "convenient" access to the element to be changed, changing or replacing elements is enormously simplified. The housing would otherwise have to be constructed in three parts, which is less maintenance friendly and associated with additional costs.

While one embodiment has been chosen to illustrate the invention, it will be understood by those skilled in the art that various changes and modifications can be made therein without departing from the scope of the invention as defined in the claims.

The invention claimed is:

1. A device for treating fluid mixtures containing a gas and a liquid, the device comprising:
   a common housing extending along a vertical axis;
   a first separation stage in said common housing capable of separating the fluid mixture into a liquid fraction and into a gas fraction with the gas fraction being contaminated with a remaining liquid fraction, said first separation stage including a centrifugal separator having a cyclone housing with an internal wall, a lower end of said internal wall bordering on a collection space and delimiting a ring opening between a pipe section concentric to said vertical axis, said centrifugal separator and said collection space, said ring opening forming a connection between said collection space and an area of a cyclone cylinder of said cyclone separator concentric to said vertical axis, said ring opening being spaced from said vertical axis, an interior space of said pipe section forming a part of a connection between an area of said cyclone cylinder proximal to said vertical axis and an upper area of said collection space; and a second separation stage in said common housing down stream of said first separation stage capable of separating the gas fraction from the remaining liquid fraction.

2. A device according to claim 1 wherein
said second separation stage comprises a coalescing filter.

3. A device according to claim 2 wherein
said common housing having a fluid mixture inlet, a separated gas fraction outlet and a cleaned liquid emptying outlet.

4. A device according to claim 3 wherein
said centrifugal separator being arranged between said coalescing filter and said collection space along said vertical axis, said centrifugal separator being below said coalescing filter and being above said collection space.

5. A device for treating fluid mixtures containing a gas and a liquid, the device comprising:
   a common housing extending along a vertical axis;
   a first separation stage in said common housing capable of separating the fluid mixture into a liquid fraction and into a gas fraction with the gas fraction being contaminated with a remaining liquid fraction, said first separation stage including a centrifugal separator having a cyclone housing with an internal wall, a lower end of said internal wall bordering on a collection space and delimiting a ring opening between a pipe section concentric to said vertical axis, said centrifugal separator and said collection space, said ring opening forming a connection between said collection space and an area of a cyclone cylinder of said cyclone separator concentric to said vertical axis, said ring opening being spaced from said vertical axis;
   a second separation stage in said common housing down stream of said first separation stage capable of separating the gas fraction from the remaining liquid fraction, said second separation stage having a coalescing filter, said coalescing filter including a filter material surrounding an inner filter cavity; and
   a connection channel extending between an upper area of said collection space and said inner filter cavity of said coalescing filter.

6. A device according to claim 5 wherein
an interior space of said pipe section forms a part of a connection between an area of said cyclone cylinder proximal to said vertical axis and an upper area of said collection space.

7. A device according to claim 5 wherein
said coalescing filter comprises a coaxial inner pipe opening at an upper end thereof in a space of said common housing of said first and second separation stages bordering outside of said filter material and leading at a lower end thereof to a gas fraction outlet of said common housing.

8. A device according to claim 5 wherein
a third separation stage is between said upper area of said collection space and said connection channel, said third separation stage having a demister.

9. A device for treating fluid mixtures containing a gas and a liquid, the device comprising:
   a common housing extending along a vertical axis;
   a first separation stage in said common housing capable of separating the fluid mixture into a liquid fraction and into a gas fraction with the gas fraction being contaminated with a remaining liquid fraction, said first separation stage including a centrifugal separator having a cyclone housing with an internal wall, a lower end of said internal wall bordering on a collection space and delimiting a ring opening between a pipe section concentric to said vertical axis, said centrifugal separator and said collection space, said ring opening forming a connection between said collection space and an area of a cyclone cylinder of said cyclone separator concentric to said vertical axis, said ring opening being spaced from said vertical axis;
   a second separation stage in said common housing down stream of said first separation stage capable of separating the gas fraction from the remaining liquid fraction; and
   a particle filter between a floor area of said collection space and an emptying outlet of said collection space.

10. A device for treating fluid mixtures containing a gas and a liquid, the device comprising:
    a common housing extending along a vertical axis;
    a first separation stage in said common housing capable of separating the fluid mixture into a liquid fraction and into a gas fraction with the gas fraction being contaminated with a remaining liquid fraction; and
    a second separation stage in said common housing downstream of said first separation stage capable of separating the gas fraction from a portion of the remaining liquid fraction, said second separation stage including coalescing filter, said coalescing filter having a coaxial interior pipe opening at an upper end thereof into a space of said common housing bordering outside of filter material of said coalescing filter and leading to a gas fraction outlet in said common housing.

11. A device for treating fluid mixtures containing a gas and a liquid, the device comprising:
    a common axis extending along a vertical axis and having a collection space therein;
    a first separation stage in said common housing capable of separating the fluid mixture into a liquid fraction and into a gas fraction with the gas fraction being contaminated with a remaining liquid fraction;
    a second separation stage in said common housing downstream of said first separation stage capable of separating the gas fraction from a portion of the remaining liquid fraction, said second separation stage having a coalescing filter having filter material surrounding an inner filter cavity;
    a connection channel extending between an upper area of said collection space and said filter cavity; and
    a third separation stage between said upper area of said collection space and said connection channel, said third separation stage including a demister.

12. A device for treating fluid mixtures containing a gas and a liquid, the device comprising:
    a common housing extending along a vertical axis and having a collection space therein;
    a first separation stage in said common housing capable of separating the fluid mixture into a liquid fraction and into a gas fraction with the gas fraction being contaminated with a remaining liquid fraction;

a second separation stage in said common housing downstream of said first separation stage capable of separating the gas fraction from a portion of the remaining liquid fraction; and
a particle filter between a floor area of said collection space and an emptying outlet of said collection space.

* * * * *